Figure 1:
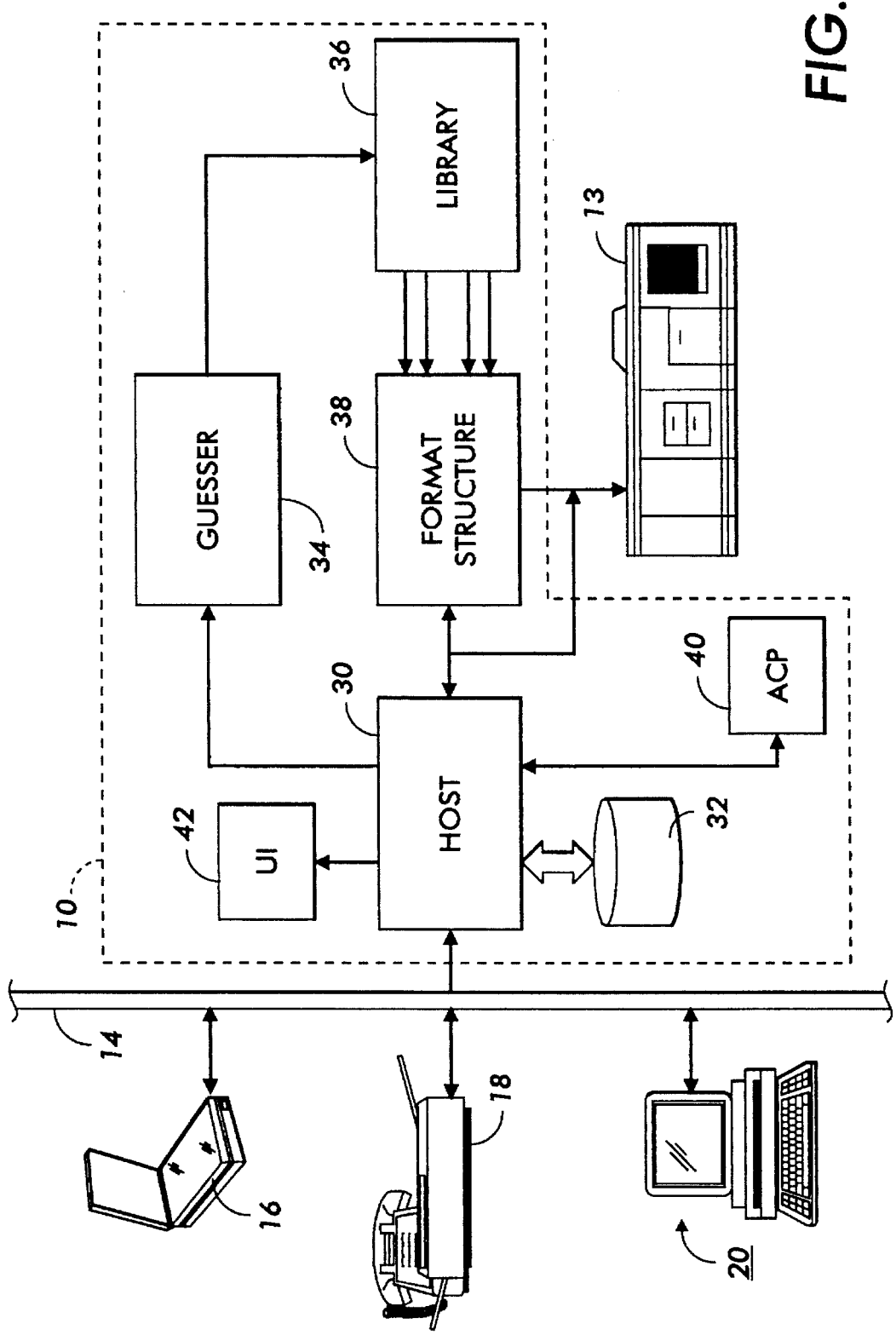

United States Patent [19]
Brindle et al.

[11] Patent Number: 5,526,469
[45] Date of Patent: Jun. 11, 1996

[54] SYSTEM FOR PRINTING IMAGE DATA IN A VERSATILE PRINT SERVER

[75] Inventors: Edward E. Brindle; John C. Czudak, both of Webster; David B. Mensing, Hilton, all of N.Y.

[73] Assignee: Xerox Corporation, Stamford, Conn.

[21] Appl. No.: 259,821

[22] Filed: Jun. 14, 1994

[51] Int. Cl.$^6$ .................................................. G06K 15/00
[52] U.S. Cl. ........................ 395/109; 395/110; 395/112; 395/114
[58] Field of Search ................................... 395/109, 112, 395/114, 106, 110

[56] References Cited

U.S. PATENT DOCUMENTS

| | | | |
|---|---|---|---|
| 5,010,514 | 4/1991 | Kippenham et al. | 395/850 |
| 5,222,200 | 6/1993 | Callister et al. | 395/112 |
| 5,226,112 | 7/1993 | Mensing et al. | 395/114 |
| 5,303,336 | 4/1994 | Kageyama et al. | 395/112 |
| 5,392,419 | 2/1995 | Walton | 395/112 |

FOREIGN PATENT DOCUMENTS 0545648  6/1993  European Pat. Off. .......... G06F 3/12

*Primary Examiner*—Mark R. Powell
*Assistant Examiner*—Tracy M. Legree
*Attorney, Agent, or Firm*—R. Hutter

[57] ABSTRACT

A system for operatively connecting a source of a quantity of digital data having an image data format associated therewith, and an output device to create a print of the original image based on the digital data. A library includes a plurality of selectable format variable sets, each format variable set corresponding to an image data format. A portion of the quantity of digital data is polled for evidence relating to the presence of one image data format. A format structure operates the output device to print an image based on the digital data according to the format variables entered therein. One of the format variable sets is entered into the format structure, based on evidence in the portion of the quantity of digital data.

15 Claims, 1 Drawing Sheet

5,526,469

SYSTEM FOR PRINTING IMAGE DATA IN A VERSATILE PRINT SERVER

This application incorporates by reference U.S. Pat. No. 5,226,112, and U.S. patent application Ser. No. 08/052,498 filed Apr. 23, 1993, entitled "Apparatus and Method for Determining the Page Description Language in which a Print Job is Written," both assigned to the assignee hereof.

The present invention relates to a server for a networked printing system, which is generally adapted to print images based on data in any number of image data formats. Specifically, the present invention relates to a system for printing images based on digital image data, while making only minimal modifications to the system to interpret various image data formats.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc. More importantly, small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

Basically, with PDLs, the character strings forming the letters of the text cause the printer to generate, at the time of printing, bitmaps for the letters in a given desired typeface. Well-known commercially-available PDLs include Post-Script, HP-PCL, and Interpress. However, there are available other conventions, called "image formats," for organizing image data independent of any typefaces therein. Image formats are generally used as a system of "shorthand"0 commands which enable raw image data (i.e., a set of binary numbers corresponding to write-black and write-white pixels) to be compressed into a more manageable form. To take one basic example, an image format may include, within a data set, an instruction corresponding to "print a white line" in lieu of a long string of numbers (such as zeros), each number corresponding to one individual pixel in the white line. In this way, image data may be retained in smaller memory spaces than would be required if every single pixel in an image had its own bit of memory. These "image formats" include TIFF and CALS, as well as those image formats which are associated with facsimile transmission, such as CCITT fax Group 3 and fax Group 4.

The relative advantages and disadvantages of PDLs versus image formats relate to the fact that the text held in a PDL can be readily manipulated, as on a word processor, while text data in an image format, because it is merely a picture of words, cannot be easily accessed or manipulated. For example, one common type of image format relates to facsimile machines: generally, a facsimile machine merely sends a picture of a document being sent, and in no way reduces the text of a document being sent to data in itself. In brief, PDL-based systems are useful for high-volume operations, such as the electronic transmission of books, and in systems where text data is manipulated by various users, while image formats are useful for quick transmission of short documents such as business letters, and wherein long-term electronic storage of the document is not contemplated.

With any PDL or image format, there will inevitably be a step of "translation" of the PDL or image format data into a form usable by an output device, such as a laser printer. Printing hardware requires a stream of binary data to be input into it. Thus, the instructions within the image format, such as to "print a white line," will eventually have to be translated into the actual binary code so that, for example, this code can be applied to the modulation of a laser source in a raster output scanner, or applied sequentially to individual ejectors in an ink-jet printer.

The patent incorporated herein by reference, U.S. Pat. No. 5,226,112, discloses what is generally described as a system for translating data information from one PDL to another PDL, but the basic principle therein can be applied to translating image data directly into the binary code for operating an output device. As described in the patent, the system includes a "server" which includes a host processor and an "accelerator coprocessor," or ACP. The host processor serves as the main interface between the input data (which is in a PDL or image format) and the output of data to a decomposer or directly to an output device. The host periodically addresses the ACP, which is an independent microprocessor, with the dedicated function of performing the translation from one data form to another, particularly from one PDL to another or from one PDL to image data directly usable by the printing hardware. When a job of a particular PDL or image format enters the server, the host processor sends the untranslated data to the ACP, along with the necessary interpretation code for translating the data. Typically, the various interpretation codes for translating various PDLs or image formats are retained on a separate disk memory and retrieved by the host as needed for a particular job. Once the ACP has both the data to be translated and the suitable interpretation code, the translation process is carried out by the ACP otherwise independently of the host. Only when the translation job is finished does the ACP send back the translated data to the host, which in turn sends it on to subsequent stages in the image-processing system.

In the current market for image processing equipment, a fundamental virtue for any printing apparatus is versatility. Regardless of whether the apparatus is electrostatographic, ink-jet, or any other type, and regardless of its speed or other features, it is desirable that a printing apparatus be able to accept digital image data from any popular source of such data. Sources of digital data may include not only different types of computers using fundamentally different data formats (MS-DOS or Macintosh, for example), but also hardcopy scanners and facsimile machines. Ideally, a printing apparatus should be able to "see through" the particular format of the image data, which exists as a result of the source of the data, and directly print only that data which is intended to form the image.

According to the present invention, there is provided a system for operatively connecting a source of a quantity of digital data having an image data format associated therewith, and an output device to create a print of the original image based on the digital data. A library includes a plurality of selectable format variable sets, each format variable set corresponding to an image data format. Means are provided for polling a portion of the quantity of digital data for evidence relating to the presence of one image data format. A format structure operates the output device to print an image based on the digital data according to the format variables entered therein. Means are provided for entering one of the format variable sets into the format structure, based on evidence in the portioquantity of digital data.

In the drawings:

FIG. 1 is a systems diagram showing the basic elements of the system of the present invention, in combination with a general "versatile" system for printing image data from a variety of sources.

FIG. 1 shows the server, generally indicated as 10, which incorporates the system of the present invention. The server 10 acts as an intermediary for creating an operative connection between a printer 12, on which desired images are printed on sheets, and a network 14, which includes thereon any number of sources of digital data for images to be printed. As shown in FIG. 1, there may exist on network 14 a hard-copy scanner 16, a facsimile terminal 18, or a work station 20. In addition, there may be any number of work stations or computers of different types outputting data of different formats, such as SUN work stations, Macintosh computers, or PC-compatible computers, as well as minicomputers and mainframes. Different types of hard-copy scanner 16 may be expected to output digital data of one or another format, and there are at least two formats for facsimile data (CCITT Fax Group 4 and Fax Group 3) which are in common use. All of these various sources of digital data are preferably attached to network 14 via the well-known Ethernet protocol, in manner familiar to one of skill in the art.

Any number of scanners, facsimile machines, and work stations on a network 14 will at one time or another be desired to output data for printing hard copy on printer 12. It is the function of server 10 to effectively translate image data from any source 16, 18, or 20 entered therein into a form which is directly usable by the hardware of a printer 12. Typically, the data entered into printer 12 from server 10 will be in the form of binary data, ultimately corresponding to the various print-white and print-black areas in an image to be printed, which are more or less directly applied to hardware such as a laser modulator and a raster output scanner, or the array of ejectors in an ink-jet printer.

Server 10 is typically embodied in one or more processors, such as microprocessors, with the ultimate effect of accepting as an input data in a particular given format from whatever format it is in when it enters the server 10 and output this immediately-usable binary data.

According to the present invention, the basic elements of the server 10 include a host processor 30, which generally acts to "direct traffic" among the various other elements within the server 10. The various elements in the server 10 may exist in the form of discrete elements within a processor, such as a memory, or may exist as software instructions within the processor. Other elements of server 10 include a memory 32, which may exist external to a processor in which the bulk of server 10 is embodied, and which serves to hold translated or untranslated data as necessary in the course of the function of server 10. Other elements of server 10 include a guesser 34, a library 36, and a format structure 38. In a preferred embodiment of the present invention, the format structure 38 acts as the primary interface of server 10 with the printer 12; that is, format structure 38 is intended to act as the output source for the binary data applied to printer 12.

Also included within server 10 is an accelerator coprocessor, or ACP 40. The ACP 40 acts with the memory 32 and host 30 to function as an interpreter/emulator, particularly of a PDL, when such an emulator is desired. As such, the host 30, ACP 40, and memory 32, would act in the roles prescribed for them in, for example, U.S. Pat. No. 5,226,112, incorporated by reference herein, which describes a server capable of performing this PDL interpretation and emulation. However, according to the present invention, host 30 also includes means by which a user may, by explicit instruction or otherwise, circumvent the use of ACP 40 in applying data to printer 12.

The function of the server 10 is as follows. Data representing an image to be printed on printer 12 enters from the network 14. If the data is in the form of a PDL, the full treatment, meaning a batch-style interpretation of the data using ACP 40 with the server 10 acting as a PDL emulation, will be required. Typically, with PDL data such as PostScript or HP-PCL, the ACP takes the entire job as a batch, and translates it into a binary-based language, typically either binary data itself for direct application to the printer 12 or into a binary-based language such as Interpress, and then makes available to the host 30 the entire translated set of data for the host 30 to retrieve and ultimately send to printer 12. Because PDL data will require either compilation or the generation of bitmaps at the printer, this batch-style translation of PDL-based data is generally unavoidable.

However, if the original data entering from network 14 is in an image format such as TIFF or CALS or a facsimile format, the extra steps required for interpreting data in a PDL are not necessary. In image format, there is no generation of bitmaps for text characters in a desired type face; further, most image formats do not have to be recompiled as do many PDL programs. Significantly, regardless of whether the image format is facsimile-based or not, the nature of the image format-based data can effectively be summarized by a relatively small number of key attributes, described in the claims as "format variables," which define the few features necessary to distinguish one common type of image format from another. For example, the four image formats in common use mentioned above, the two basic image formats (TIFF and CALS) and the facsimile formats (Group 3 and Group 4) are distinguishable from one another by only about twelve differences in how each format organizes data to be applied to hardware. More significantly, each of these differences can be conveniently described by a scalar variable. Among these differences which are expressed by different variables are:

image length=number of rows of pixels in image;

image width=number of pixels per row;

image size=number of bytes in compressed image;

photometric (0=white area is a 0 bit, 1=black pixel is a 0 bit);

x-resolution=pixels per inch; y-reslolution=pixels per inch;

displacement of image from fixed origin (# of x and y pixels) fill order (1=7 to 0,2=0 to 7).

For all of these parameters, it is important to note that each parameter directly affects the physical process of organizing image data in binary form to activate a hardware device to place white or black pixels, according to the binary data on a one bit-per-pixel basis on a sheet. For example, the parameter of image width would signal to a hardware device when to start a new row of pixels on the sheet, and the image length parameter would tell the system when the data for one page ends and another page should be fed into the printer for the next image. The "photometric" relates to whether the printer should take zeros or ones in the binary data as opportunities to form a black area for that pixel location. Similarly, the "fill order" operation is useful for image formats wherein bits may be organized differently for different computer architectures. What is important is that the different scalar values inserted into the format variable set will be a unique set depending on a particular predetermined image format type.

Other differences, such as compression (whether the data is compressed in any form or not) may be summarizable as scalar variables as well; for example a code such as 3 may be used to indicate that fax Group 3 compression algorithms are used, while a code 4 would indicate that Group 4 algorithms are used. In such a case, even though the scalar code does not have a direct physical meaning, such as spots per inch, the scalar code activates certain translation subroutines (e.g., one sensitive to Group 3 compression codes) which are fixed in the translation program, and disables others which are not currently needed.

In addition to the format variables mentioned above, which are inherent to given commercial image formats such as TIFF, other parameters associated with image data may be selected by the user who is requesting that a particular quantity of image data be printed out on the printer 12. Such user-defined parameters may include, for example, the position of the image on a sheet, (centered, for example, or inverted), the type of paper stock (letter or legal, or colored) on which the image is to be printed, or whether images should be ordered on pages in "signature" form for folding into booklets (such specifications will also require that certain of the images be scaled or rotated). It will be apparent that these various provisions will have a direct and predictable effect on the bitstream supplied to the printer 12. It is to be expected that there would be certain default values of these parameters in the absence of specific instructions from the user; these default parameters generally form additional scalar values to be applied to a format structure for handling the image data. Many of the parameters relating to the output of the printed image (such as scaling and magnification) may be applied essentially independently of the scalar variables which define the image format; that is, the scalar variables which are entered into the translation program to effect a translation from one image format will typically be unaltered when a user enters other scalar variables which affect how a particular job is to be printed on paper (e.g., in signature or stapled form). There is preferably provided in the server 10 a user interface such as 42, which may be accessible either through a control panel on the printer or through an application package as part of the equipment on network 14, to alter these scalar values (for the translation or for the output) as needed to obtain a desired result.

The format structure 38 thus accepts as input both the image data for an image to be printed and the format variable set, comprising a set of scalar values, which instruct the format structure 38 with a minimum number of necessary instructions about how to send the stream of binary data to the printer 12. These instructions to the format structure 38 are on a physical level, particularly relating to how many bits are assigned to each line on the image, how many lines form the entire image on a page, at what location (as on a sheet of photoreceptor) the output of image pixels is to begin, and in a what order the pixels are to be output. Format structure 38 thus acts like a "universal translator" for converting image data of one of a plurality of forms into a final form which can be "understood" by the particular printing hardware. As it happens, however, the "dictionary" by which this translation is performed can practically be reduced to fewer than thirty scalar values in a monochrome system, although a color system would require approximately fifty scalar values. The format structure 38 exists as a standing program to perform the translation with "slots" therein into which format variables from a particular format variable set are inserted before the translation is effected. The identity of approximately twenty scalar variables (in one practical embodiment) is a function of both the image format of the data to be translated, and certain image-manipulation parameters requested by the user. In other words, a translation program for TIFF-to-bits differs from a translation program for facsimile Group 4-to-bits only in the manner of a few scalar variables within the program. The advantage of the system of the present invention is that these thirty or fewer distinguishing variables are isolated by the system and inserted into a single program as necessary.

Also shown in FIG. 1 is a guesser 34, responsive to the host 30. The purpose of the guesser 34 is to determine, when a quantity of image data is received from the network 14, what image data format the data is in. Despite the name "guesser," for most commercially-available image data formats, the guesser 14 is capable of finding conclusive evidence of what image data format the data is in just from sampling a very small portion of the image data at the beginning of the data. For example, TIFF files almost inevitably begin with the character string MM or II (to indicate Motorola or Intel systems, respectively). The guesser 34 can poll a sample of data taken from the beginning of a job for these character strings, and as MM or II are found in the first bytes, the guesser 34 will take this as evidence that the job is in TIFF. Similarly, the format CALS as well as the facsimile formats all include any number of tell-tales particularly at the headings thereof, which the guesser 34 may use as evidence (and usually conclusive evidence) that a particular job is of a particular image format. Many other types of guessing techniques may be apparent to one of skill in the art, and others are also described in detail in the patent application incorporated by reference.

Further, the function of guesser 34 can be extended to seek evidence not only of particular image formats, but for evidence of whether the job is in a PDL such as PostScript. For example, a typical unique character string found in PostScript files is the combination %!. If the guesser 34 should find this combination of variables, the guesser 34 will have an indication that the incoming job is in the PostScript PDL and therefore instruct the host 30 to activate ACP 40 for a PDL emulation. If the guesser 34 determines that the data is in an image format (as opposed to PDL), the guesser 34 can address (via the host 30 or otherwise) a library 36, which may take the form of a small quantity of dedicated memory within the processor forming server 10. Library 36 acts as a look-up table for the necessary format variable set to fill in the slots within the format structure 38 so that the data may be translated. Of course, this format variable set selected by guesser 34 is subject to revision through user interface 42, should be user have particular special instructions for the particular instance of printing.

The system of the present invention thus provides a system for use in a "universal" printing apparatus which is intended to accept data of a wide variety of image data formats, a system by which data in image formats (as opposed to PDLs) may be quickly output by the printer, without the wasted time of performing a batch-type translation of the data, which is necessary with PDLs. The present invention posits a formal structure which acts as a universal translation program for most known types of image data formats, and relies on minimal changes to this universal program to facilitate translation of data from different image data formats. The differences among the various image data formats which may be called upon are isolated to thirty or fewer scalar variables. These scalar variables are plugged into this universal translation program as needed for translating a job in a particular image data format.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

We claim:

1. A system for operatively connecting a source of a quantity of digital data having an image data format associated therewith, and an output device to create a print of the original image based on the digital data, comprising:

a library including a plurality of selectable format variable sets, each format variable set corresponding to an image data format, each format variable set comprising a set of scalar values;

means for polling a portion of the quantity of digital data for evidence relating to the presence of one image data format;

a format structure, adapted to operate the output device to print an image based on the digital data according to the format variables entered therein; and means for entering the scalar values from one of the format variable sets into the format structure, based on the evidence in the portion of the quantity of digital data.

2. The system of claim 1, wherein the format structure outputs binary data immediately applicable to the output device.

3. The system of claim 1, wherein the format structure comprises a translation program for translating data of an image format to binary data usable by the output device.

4. The system of claim 3, wherein the translation program comprises a translation program for a first image data format when a first format variable set is entered therein, and represents a translation program for a second image data format when a second format variable set is entered therein.

5. The system of claim 1, wherein each format variable set consists of a set of fewer than thirty scalar values.

6. The system of claim 1, further comprising a user interface associated with the format structure, enabling a user to alter scalar values from the selected format variable set.

7. The system of claim 6, the user interface comprising means available to the user for selecting a position and magnification of an image based on the digital data on a print sheet, the selecting means including means for altering scalar values according to the selected position and magnification.

8. The system of claim 1, further comprising:

a coprocessor adapted to translate image data in the form of a page description language; and means for selecting either the format structure or the coprocessor for translating a quantity of image data.

9. The system of claim 8, wherein the selecting means is responsive to the polling means.

10. The system of claim 1, wherein each format variable set consists of a plurality of scalar values.

11. The system of claim 1, wherein each format variable set consists of fewer than thirty scalar values.

12. The system of claim 1, wherein the format structure functions as a TIFF translation program when a selected format variable set is entered therein.

13. The system of claim 1, wherein the format structure functions as a CALS translation program when a selected format variable set is entered therein.

14. The system of claim 1, wherein the format structure functions as a CCITT Group 3 translation program when a selected format variable set is entered therein.

15. The system of claim 1, wherein the format structure functions as a CCITT Group 4 translation program when a selected format variable set is entered therein.

* * * * *